United States Patent
Heinrichs

(10) Patent No.: US 8,938,538 B2
(45) Date of Patent: Jan. 20, 2015

(54) SERVER HAVING AN INTERFACE FOR CONNECTING TO A SERVER SYSTEM AND SERVER SYSTEM

(75) Inventor: Hans-Juergen Heinrichs, Altenbeken (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 202 days.

(21) Appl. No.: 12/535,611

(22) Filed: Aug. 4, 2009

(65) Prior Publication Data
US 2009/0292808 A1    Nov. 26, 2009

Related U.S. Application Data

(63) Continuation-in-part of application No. PCT/EP2008/063557, filed on Oct. 9, 2008.

(30) Foreign Application Priority Data

Oct. 25, 2007 (DE) .......................... 10 2007 051 170

(51) Int. Cl.
*G06F 15/173* (2006.01)
*G06F 13/42* (2006.01)

(52) U.S. Cl.
CPC ................................... *G06F 13/4291* (2013.01)
USPC ............................ 709/225; 709/227; 709/228

(58) Field of Classification Search
CPC ..................... H04L 29/0809; H04L 29/08072; H04L 29/06
USPC .......................................... 709/225, 227, 228
See application file for complete search history.

(56) References Cited

U.S. PATENT DOCUMENTS

| 6,145,036 | A | * | 11/2000 | Barenys et al. | 710/300 |
| 6,363,437 | B1 | * | 3/2002 | Ptasinski et al. | 710/10 |
| 6,622,188 | B1 | * | 9/2003 | Goodwin et al. | 710/105 |

(Continued)

FOREIGN PATENT DOCUMENTS

| CN | 1635746 | 7/2005 | .............. H04L 12/28 |
| EP | 0 619 548 | 10/1994 | .............. G06F 13/40 |

(Continued)

OTHER PUBLICATIONS

"I2C: Integrated Circuit", Wikipedia (4 pgs).

(Continued)

*Primary Examiner* — Philip Chea
*Assistant Examiner* — Van Kim T Nguyen
(74) *Attorney, Agent, or Firm* — Hayes Soloway P.C.

(57) ABSTRACT

A server with an interface for connecting to a server system and server system is provided. The server includes an interface for connecting a server system, and features a component carrier for holding several servers with a serial management bus and several servers that are connected to the management bus via serial interfaces, wherein one server is set up as a management server and other servers are set up as data-processing servers. The management server has an acknowledgement device that, after sending a control command to a management bus of the server system, generates an acknowledge signal for acknowledging the control command. Furthermore, the server system is set up such that information is transmitted in a unidirectional manner from the management server to the data-processing servers via the serial management bus.

10 Claims, 2 Drawing Sheets

(56) References Cited

U.S. PATENT DOCUMENTS

| | | | |
|---|---|---|---|
| 6,629,172 B1* | 9/2003 | Andersson et al. | 710/104 |
| 6,779,046 B1* | 8/2004 | Osuga | 710/14 |
| 7,231,467 B2* | 6/2007 | Baker et al. | 710/9 |
| 7,386,638 B2* | 6/2008 | Voth et al. | 710/10 |
| 7,502,991 B2* | 3/2009 | Aldereguia et al. | 714/800 |
| 7,657,677 B2 | 2/2010 | Huang et al. | |
| 7,739,435 B2* | 6/2010 | Gideons | 710/105 |
| 7,791,907 B2* | 9/2010 | Cho et al. | 363/21.01 |
| 2003/0002497 A1 | 1/2003 | Vasudevan | 370/389 |
| 2003/0033366 A1 | 2/2003 | Garnett et al. | 709/203 |
| 2005/0018454 A1 | 1/2005 | Deng et al. | |
| 2005/0047098 A1 | 3/2005 | Garnett et al. | |
| 2005/0091427 A1* | 4/2005 | Yoshida et al. | 710/48 |
| 2005/0105628 A1* | 5/2005 | Koch et al. | 375/259 |
| 2006/0140211 A1 | 6/2006 | Huang et al. | 370/466 |
| 2006/0200605 A1* | 9/2006 | Hatamori | 710/110 |
| 2007/0204088 A1* | 8/2007 | Chen | 710/301 |
| 2008/0086578 A1* | 4/2008 | Yoshida et al. | 710/48 |

FOREIGN PATENT DOCUMENTS

| | | | |
|---|---|---|---|
| TW | M270514 | 7/2005 | |
| TW | 200723004 | 6/2007 | |
| WO | WO 00/41073 | 7/2000 | G06F 9/445 |

OTHER PUBLICATIONS

International Search/Examination Report (14 pgs).

Office Action issued in Application No. 200880002754.3 dated Jul. 22, 2011 (6 pgs).

Taiwan Examination Report English Translation, Appln. No. 097139310 (6 pgs).

(Resubmitted)Taiwan Examination Report English Translation, Appln. No. 097139310 (6 pgs).

European Examination Report (with no English translation) issued in related application No. 08 842 673.9, dated Aug. 20, 2013 (5 pgs).

* cited by examiner

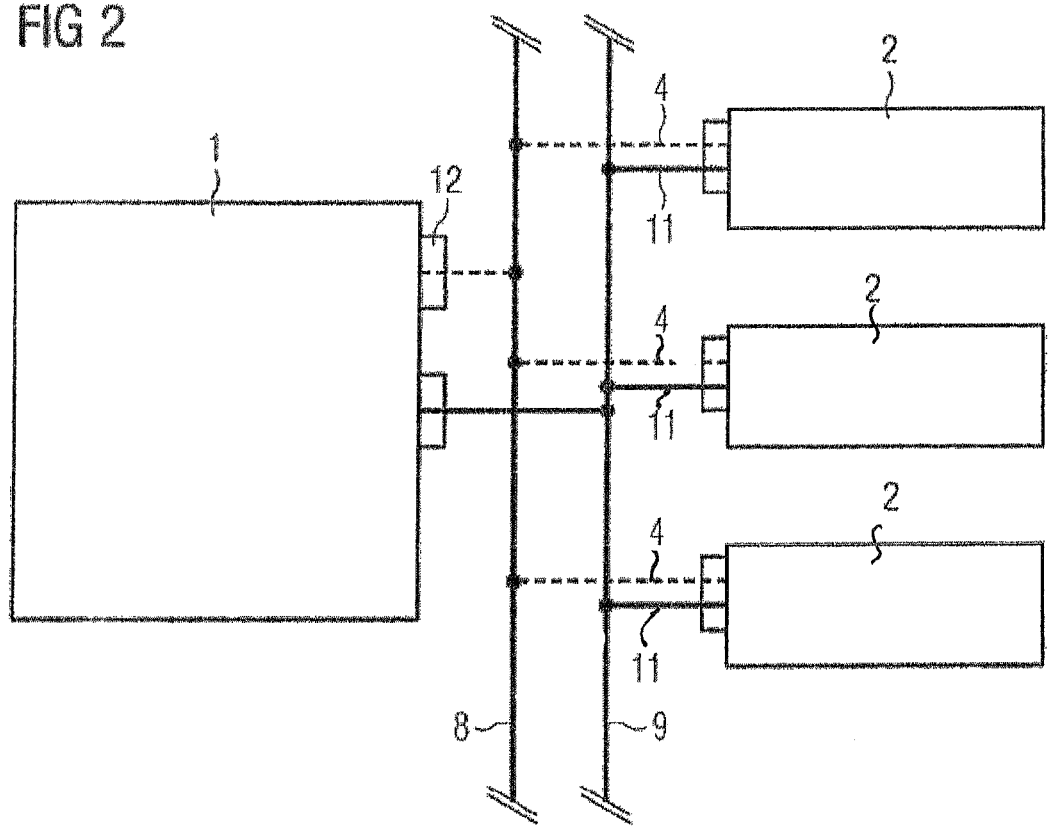

SERVER HAVING AN INTERFACE FOR CONNECTING TO A SERVER SYSTEM AND SERVER SYSTEM

CROSS REFERENCE TO RELATED APPLICATIONS

This application is a continuation-in-part of PCT International Patent Application Serial No. PCT/EP2008/63557, filed Oct. 9, 2008, designating the United States. Priority is also claimed from German Patent Application Serial No. 10 2007 051170.3, filed Oct. 25, 2007.

BACKGROUND OF THE INVENTION

The invention relates to a server with an interface for connecting to a server system and to a server system.

FIELD OF THE INVENTION

In server systems, for example, blade server systems, all of the blade servers must communicate with each other in various ways in order to exchange useful data, status information, and control commands. The exchange of useful data can take place, e.g., via Ethernet according to TCP/IP infrastructure. The control of the server for management purposes, however, usually takes place by means of a separate hardware interface, for example, a management bus. As a rule, in a blade server system, the so-called management server takes over the management of other servers that are set up as data-processing servers.

The management server has, among other things, the task of identifying data-processing servers connected to a management bus, addressing these data-processing servers, and controlling them by means of hardware commands. A control command can include, for example, the turning on or off of a data-processing server or a certain function of the data-processing server.

The use of a serial, bidirectional management bus like the I2C bus has the disadvantage that, for an error function of a server, the entire bus is blocked and other servers no longer have the possibility of accessing the bus until the error is corrected.

A unidirectional, parallel bus does avoid a blockade of the entire bus if there is an error function in one of the data-processing servers, because only the management server transmits, but it requires a large number of data lines and pins for the plug contacts between the bus and the connected servers. In addition, it requires several additional logic components and special software drivers to the servers, because the management server and the data-processing servers are set up, as a rule, for communicating via an I2C BUS.

Therefore, the invention is based on the problem of disclosing a server and also a server system, wherein a simple control that is improved with respect to error susceptibility is possible for several servers in a server system.

SUMMARY OF THE INVENTION

This problem is solved according to the invention by means of a server of the type named above in that the server has an acknowledgment device that, after sending a control command to a management bus of the server system, generates an acknowledge signal for acknowledging the control command. Furthermore, the problem is solved by means of a server system of the type named above, such that the server system is set up so that information is transmitted in a unidirectional manner from the management server via the serial management bus to the data-processing servers and the management server has an acknowledgment device that, after sending a control command to the management bus, generates an acknowledge signal for acknowledging the control command. The invention features a component carrier for holding several servers with a serial management bus and several servers that are connected via serial interfaces to the management bus, wherein one server is set up as a management server and the other servers are set up as data-processing servers.

The solutions according to the invention have the advantage that the management bus is loaded only by the management server and thus reacts significantly more robustly to disturbance in the data-processing servers that have the ability to merely receive. By means of the serial bus, the number of necessary connection pins is also reduced, because significantly fewer lines must be differentiated. The acknowledgment device allows the management server to include an acknowledgment of the control commands sent to a data-processing server in the protocol despite the unidirectionality of the management bus. Thus, apart from the acknowledgement device, standard components could be used for I2C.

Preferably, the protocol for transmitting control commands via the management bus is based on the I2C standard, wherein the acknowledge signal of the acknowledgment device corresponds to the acknowledge signal according to the I2C standard. Therefore, it is possible to use software drivers based on the I2C standard.

Advantageously, the server system has one or more additional data buses that connect servers to each other, wherein data can be transmitted via the data buses in a bidirectional manner between the management server and the data-processing servers. That is, primarily the hardware control takes place in a unidirectional manner between the management server and the data-processing servers and other information is exchanged between the connected servers in a bidirectional manner via the data buses.

Preferably, a data-processing server is set up to be connected or removed during continuous operation of the server system. This has the advantage that components of the server system could be removed and then re-mounted, for example, for maintenance reasons without having to shut down and turn off the entire system. Thus, the system remains available without any interruptions even when there are modifications.

BRIEF DESCRIPTION OF THE DRAWINGS

Further features and advantages of the invention will be seen by reference to the drawings, wherein like numerals depict like parts, and wherein.

DETAILED DESCRIPTION OF THE INVENTION

Figure 1:
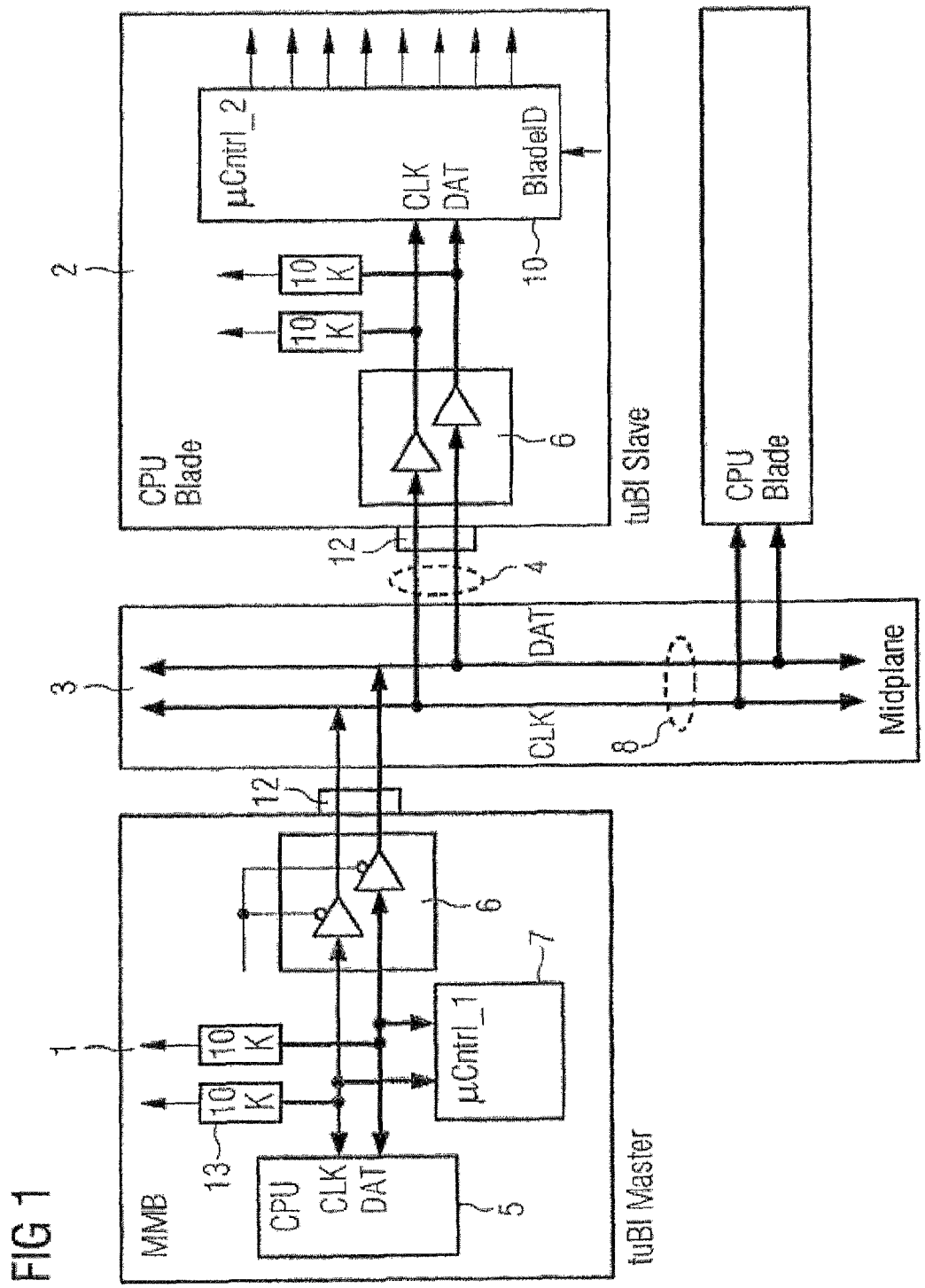
FIG. 1 a schematic block diagram of a system consisting of a management server, management bus, and several data-processing servers, and FIG. 2 a schematic block diagram of another possible system of a management 7 server, two bus lines, and several data-processing servers.

FIG. 1 shows a schematic block diagram of a possible system consisting of a management server 1, a management bus 8 that is installed on a component carrier 3, and also several data-processing servers 2. The management server 1 and also the data-processing servers 2 are connected via interfaces 12 and unidirectional data lines 4 to the management bus 8. Due to the unidirectionality, a data flow is only given from the management server 1 to the data-processing servers 2. The data-processing servers 2 are controlled by means of hardware commands that are transmitted from the management server 1 to the management bus 8, transmitted via the management bus 8, and received by the data-processing servers 2. The management bus 8 comprises two lines for a clock signal CLK and data signals DAT. In addition, the management server 1 has a TTL component 6 that operates as a bus driver. The data-processing servers 2 each also have a TTL component 6 that receives signals from the management bus 8 and forwards them to a microcontroller unit 10 for interpretation. The management server 1 has a microcontroller unit 7 that shows an acknowledgment device and generates an acknowledge signal as soon as a control command is transmitted from the management server 1 to the management bus 8.

For example, the CPU 5 of the management server 1 generates a control command that is transmitted to the TTL component 6 in the form of voltage levels that alternate between a high and low level. By means of two pull-up resistors 13 on the clock line CLK and the data line DAT, defined states are guaranteed, wherein the pull-up resistors 13 are here dimensioned, for example, to 10 kOhm. The TTL component 6 converts the internal bidirectional signals into unidirectional signals and transmits these via the interface 12 to the management bus 8, wherein the level corresponding to the clock signal CLK are transmitted to the CLK line and the levels corresponding to the data signals DAT are transmitted to the DAT line of the management bus 8.

Simultaneously, the acknowledgment device 7 of the management server 1 generates an acknowledge signal for acknowledging the transmitted control command. This acknowledge signal is required, because the data-processing servers 2 can only receive and it is needed for compatibility with software drivers operating according to the I2C standard.

By means of the component 6, control commands are transmitted from the management server 1 to the corresponding data-processing servers 2, wherein the server system has a protocol that is compatible with the I2C standard. Thus, decoupling of the internal bus from the management bus is given.

The logic levels run via the lines DAT and CLK of the management bus 8 to an addressed data-processing server 2 that receives the signals from the lines DAT and CLK of the management bus 8 via unidirectional data lines 4 to its interface 12. In the TTL component 6 of the data-processing server 2, the signals are then converted again into internal bus signals and are transmitted via two lines CLK and DATA provided with pull-up resistors 13 to the microcontroller unit 10. The microcontroller unit 10 then interprets the received signals as control command.

FIG. 2 shows a block diagram of an expanded embodiment of a management server 1, a management bus 8, and a data bus 9, and also several data-processing servers 2. All of the servers 1 and 2 are connected to the two buses 8 and 9 via interfaces 12. Here, control commands are transmitted from the management server 1 via unidirectional data lines 4, indicated by dashed lines, according to FIG. 1 to the corresponding data-processing servers 2. In addition, it is possible for the management server 1 and the data-processing servers 2 to exchange information via bidirectional data lines 11 on a data bus 9. For example, a management server 1 could transmit via the management bus 8 an activation command to a data-processing server 2, wherein the data-processing server 2 is turned on and then sends a data packet back via the data bus 9 to the management server 1. Thus, the hardware control of the data-processing servers 2 is realized via the robust unidirectional management bus 8 and the data exchange between all of the servers 1 and 2 via the bidirectional data bus 9.

The structures and embodiments shown do not have a restrictive effect on the invention. Thus, a server system according to FIGS. 1 and 2 could also contain several management servers 1, wherein, for example, the priority of the individual management server 1 is assigned by means of an additional control signal. Therefore, it should be avoided that several management servers 1 engage simultaneously in the system in a controlling manner. A non-active management server 1 could here either function as a data-processing server 2 or be in a rest state until it receives the priority again to control the system as an active management server 1. In addition, a control command would be conceivable by means of which all of the data-processing servers 2 could be controlled simultaneously. Furthermore, the management server or servers could take over data-processing tasks like the data-processing servers in addition to its own or their management and control tasks.

The invention claimed is:

1. A server with an interface for connecting to a server system, wherein
the server has a microcontroller unit having an acknowledgment device that generates an acknowledge signal for acknowledging a control command after said control command is transmitted from the server to a management bus, and
wherein the server system comprises a component carrier for holding several servers with a serial management bus and several servers that are connected via serial interfaces to the management bus, wherein one server is set up as a management server and the other servers are set up as data processing servers, wherein the server system is set up such that information is transmitted only in a unidirectional manner from the management server via the serial management bus to the data processing servers and the management server has a CPU, a bus driver and a microcontroller unit, the CPU being adapted to generate a control command, to send the control command to a bus driver that converts the control command from a bidirectional signal into a unidirectional signal and transmits the converted signal via the interface to the management bus, and the microcontroller unit being adapted as an acknowledgement device that, after sending a control command from the management server to the management bus, generates an acknowledge signal for acknowledging the sent control command.

2. The server according to claim 1, wherein the server has a CPU that generates the control command and a bus driver that converts the control command from an internal bidirectional signal into a unidirectional signal and sends the control command as a unidirectional signal to the management bus.

3. A server system comprising a component carrier for holding several servers with a serial management bus and several servers that are connected via serial interfaces to the management bus. wherein one server is set up as a management server and other servers are set up as data-processing servers, wherein
the server system is set up such that information is transmitted only in a unidirectional manner from the management server via the serial management bus to the data-processing servers and the management server has an acknowledgment device that, after sending a control command from the management server to the management bus, generates an acknowledge signal for acknowledging the sent control command, and wherein the server system comprises a component carrier for holding several servers with a serial management bus and several servers that are connected via serial interfaces to the management bus, wherein one server is set up as a management server and the other servers are set up as data processing servers, wherein the server system is set up such that information is transmitted only in a unidirectional manner from the management server via the serial management bus to the data processing servers and the management server has a CPU, a bus driver and a microcontroller unit, the CPU being adapted to generate a control command, to send the control command to a bus driver that converts the control command from a bidirectional signal into a unidirectional signal and transmits the converted signal via the interface to the management bus, and the microcontroller unit being adapted as an acknowledgement device that, after sending a control command from the management server to the management bus, generates an acknowledge signal for acknowledging the sent control command.

4. The server system according to claim 3, wherein the protocol for sending control commands via the management bus is based on the I2C standard, wherein the acknowledge signal of the acknowledgement device corresponds to the acknowledge signal according to the I2C standard.

5. The server system according to claim 3, wherein
the management bus includes two lines, wherein one line is provided for a clock signal (CLK) and the other line is provided for a data signal (DAT).

6. The server system according to claim 3, wherein the server system has one or more additional data buses that connect the servers to each other, wherein data can be transmitted in a bidirectional manner via the data buses between the management server and the data-processing servers.

7. The server system according to claim 3, wherein a data-processing server is set up to be connected or removed during continuous operation of the server system.

8. The server system according to claim 3, wherein the management server has a CPU that generates the control command and a bus driver that converts the control command from an internal bidirectional signal into a unidirectional signal and sends the control command as a unidirectional signal to the management bus.

9. A server with an interface for connecting to a server system. wherein the server has a CPU, a bus driver and a microcontroller unit, the CPU being adapted to generate a control command, to send the control command to a bus driver that converts the control command from a bidirectional signal into a unidirectional signal and transmits the converted signal via the interface to a management bus, and the microcontroller unit being adapted as an acknowledgement device that generates an acknowledgement signal for acknowledging a control command after said control command is transmitted from the server to the management bus, and wherein the server system comprises a component carrier for holding several servers with a serial management bus and several servers that are connected via serial interfaces to the management bus, wherein one server is set up as a management server and the other servers are set up as data processing servers, wherein the server system is set up such that information is transmitted only in a unidirectional manner from the management server via the serial management bus to the data processing servers and the management server has a CPU, a bus driver and a microcontroller unit, the CPU being adapted to generate a control command, to send the control command to a bus driver that converts the control command from a bidirectional signal into a unidirectional signal and transmits the converted signal via the interface to the management bus, and the microcontroller unit being adapted as an acknowledgement device that, after sending a control command from the management server to the management bus, generates an acknowledge signal for acknowledging the sent control command.

10. A server system comprising a component carrier for holding several servers with a serial management bus and several servers that are connected via serial interfaces to the management bus, wherein one server is set up as a management server and the other servers are set up as data processing servers, wherein the server system is set up such that information is transmitted only in a unidirectional manner from the management server via the serial management bus to the data processing servers and the management server has a CPU, a bus driver and a microcontroller unit, the CPU being adapted to generate a control command, to send the control command to a bus driver that converts the control command from a bidirectional signal into a unidirectional signal and transmits the converted signal via the interface to the management bus, and the microcontroller unit being adapted as an acknowledgement device that, after sending a control command from the management server to the management bus, generates an acknowledge signal for acknowledging the sent control command.

* * * * *

UNITED STATES PATENT AND TRADEMARK OFFICE
CERTIFICATE OF CORRECTION

| | | |
|---|---|---|
| PATENT NO. | : 8,938,538 B2 | |
| APPLICATION NO. | : 12/535611 | |
| DATED | : January 20, 2015 | |
| INVENTOR(S) | : Heinrichs | |

It is certified that error appears in the above-identified patent and that said Letters Patent is hereby corrected as shown below:

In the Claims

Claim 3, Col. 4, line 57 "bus. wherein" should be --bus, wherein--

Claim 9, Col. 5, line 45 "system. wherein" should be --system, wherein--

Signed and Sealed this
Ninth Day of June, 2015

Michelle K. Lee
*Director of the United States Patent and Trademark Office*